United States Patent
Kulshreshtha et al.

(10) Patent No.: US 10,601,683 B1
(45) Date of Patent: Mar. 24, 2020

(54) AVAILABILITY OF A DISTRIBUTED APPLICATION USING DIVERSITY SCORES

(71) Applicant: Amazon Technologies, Inc., Seattle, WA (US)

(72) Inventors: Rohit Kulshreshtha, Seattle, WA (US); Christopher Richard Jacques de Kadt, Seattle, WA (US); Carlos Vara Callau, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 241 days.

(21) Appl. No.: 15/382,856

(22) Filed: Dec. 19, 2016

(51) Int. Cl.
| | | |
|---|---|---|
| *H04L 29/08* | (2006.01) | |
| *G06F 11/00* | (2006.01) | |
| *H04L 12/24* | (2006.01) | |
| *G06F 11/07* | (2006.01) | |
| *G06F 11/20* | (2006.01) | |
| *G06F 9/50* | (2006.01) | |

(52) U.S. Cl.
CPC ........ *H04L 41/5054* (2013.01); *G06F 11/008* (2013.01); *H04L 41/5096* (2013.01); *H04L 67/1002* (2013.01); *H04L 67/16* (2013.01); *G06F 9/5083* (2013.01); *G06F 11/0709* (2013.01); *G06F 11/203* (2013.01); *H04L 41/0654* (2013.01); *H04L 67/1031* (2013.01); *H04L 67/1036* (2013.01)

(58) Field of Classification Search
CPC ... H04L 47/783; H04L 67/10; H04L 41/0806; H04L 41/5051; H04L 41/5054; H04L 43/08; H04L 43/16; H04L 67/025; H04L 67/16; H04L 41/0654; H04L 67/1036; G06F 9/5072; G06F 9/5077; G06F 11/0712; G06F 2009/45562; G06F 2009/4557; G06F 2009/45595; G06F 11/008; G06F 11/0709; G06F 11/203
See application file for complete search history.

(56) References Cited

U.S. PATENT DOCUMENTS

| | | | |
|---|---|---|---|
| 2016/0299772 A1* | 10/2016 | Seenappa | G06F 9/45558 |
| 2016/0366232 A1* | 12/2016 | Battle | H04L 67/16 |
| 2017/0026416 A1* | 1/2017 | Carpenter | H04L 41/0866 |
| 2017/0048321 A1* | 2/2017 | Bernbo | H04L 12/1845 |
| 2018/0067778 A1* | 3/2018 | Hawilo | G06F 9/5033 |

* cited by examiner

*Primary Examiner* — Tom Y Chang
(74) *Attorney, Agent, or Firm* — Lee & Hayes, P.C.

(57) ABSTRACT

Technologies are disclosed for improving the availability of a distributed application by computing scores for the application that indicate the extent to which the configuration of hosts implementing the application complies with best practices for maximizing availability. One score can be generated for the application based upon the physical location of the hosts used to implement the application and the components upon which the application is dependent. Another score can be generated for the application based upon the number of data centers that hosts executing the application are located in as compared to a minimum required number of data centers. Another score can be generated for the application based upon the distribution of hosts utilized to execute the application across data centers. Operations can be initiated for improving the scores, such as migrating a host to a new rack or server, or migrating a host to a different data center.

20 Claims, 6 Drawing Sheets

DIVERSITY REPORT

APPLICATION DIVERSITY REPORT

| HOSTNAME | REGION | DC | RACK | SERVER |
|---|---|---|---|---|
| HOST1 | 1 | 1 | 1 | 1 |
| HOST2 | 1 | 1 | 1 | 1 |
| HOST3 | 1 | 1 | 1 | 2 |
| HOST4 | 1 | 1 | 2 | 3 |
| HOST5 | 2 | 2 | 3 | 4 |

MINIMUM 3 DATA CENTERS

SCORE = 0
SUGGESTION: MOVE ONE HOST FROM DC1 TO DC3 ⟵ 130A

PHYSICAL LOCATION DIVERSITY

SCORE = 75
WARNING: THE FOLLOWING HOSTS ARE SHARING THE SAME RACK, OR WORSE, THE SAME VIRTUALIZATION PARENT (SERVER): HOST1, HOST2, HOST3

SUGGESTION: MOVE TWO HOSTS FROM RACK1 ⟵ 130B

UNIFORM HOST DISTRIBUTION OVER DATA CENTERS

SCORE = 50
IDEAL DISTRIBUTION OF FIVE HOSTS OVER DATA CENTERS IS [2, 2, 1]. CURRENT DISTRIBUTION IS [AZ1:4, AZ2:1].

SUGGESTION: MOVE TWO HOSTS FROM DC1 TO DC3 ⟵ 130C

FIG. 5

AVAILABILITY OF A DISTRIBUTED APPLICATION USING DIVERSITY SCORES

BACKGROUND

Some network-based computing service providers allow customers to purchase and utilize computing resources, such as virtual machine ("VM") instances, on a permanent or as-needed basis. In addition to VM instances, such computing service providers typically allow customers to purchase and utilize other types of computing resources. For example, customers might be permitted to purchase access to and use of file and block data storage resources, database resources, networking resources, and other types of computing resources. Utilizing these computing resources as building blocks, customers of such a network-based computing service provider can create distributed applications that provide various types of functionality, such as application hosting, backup and storage, content delivery, World Wide Web ("Web") hosting, enterprise information technology ("IT") solutions, database services, and others.

Network-based distributed applications, such as those described above, commonly improve availability by relying upon redundancies for their dependencies. Redundant dependencies allow the application to switch over to substitutes when any dependency fails. For example, if one of the hosts utilized to implement an application fails because of a loss of power, another host in another rack or data center that has not lost power can be utilized. In this way, availability of the application can be maintained in the event of failures.

When deploying a distributed application, system administrators must take care to choose a diverse set of redundant dependencies with a low probability of correlated failure. For example, if a distributed application is executing on two hosts, and the two hosts share the same power supply, then the two hosts are not appropriate substitutes for one another because they will both fail if the power supply fails or there is a power failure. A correlated failure such as this can occur due to the failure of any type of dependency, such as networking components, power or power components, and heating or cooling components. A correlated failure can also occur due to the failure of software components or network services utilized by a distributed application.

After deployment of a distributed application, care must also be taken to maintain the diversity of redundant dependencies. For example, if a system administrator needs to replace one of two hosts, the new replacement host should have the lowest probability of a correlated failure with the existing host. Creating and maintaining redundant dependencies can, however, be difficult for system administrators. As a result, it is not uncommon for distributed applications to fail due to a correlated failure of hosts as a result of the failure of a dependency. This can significantly impact the availability of the application.

The disclosure made herein is presented with respect to these and other considerations.

BRIEF DESCRIPTION OF THE DRAWINGS

FIG. 5 is a user interface diagram showing an illustrative diversity report generated by the availability improvement service of FIG. 1, according to one particular configuration.

DETAILED DESCRIPTION

Figure 1:
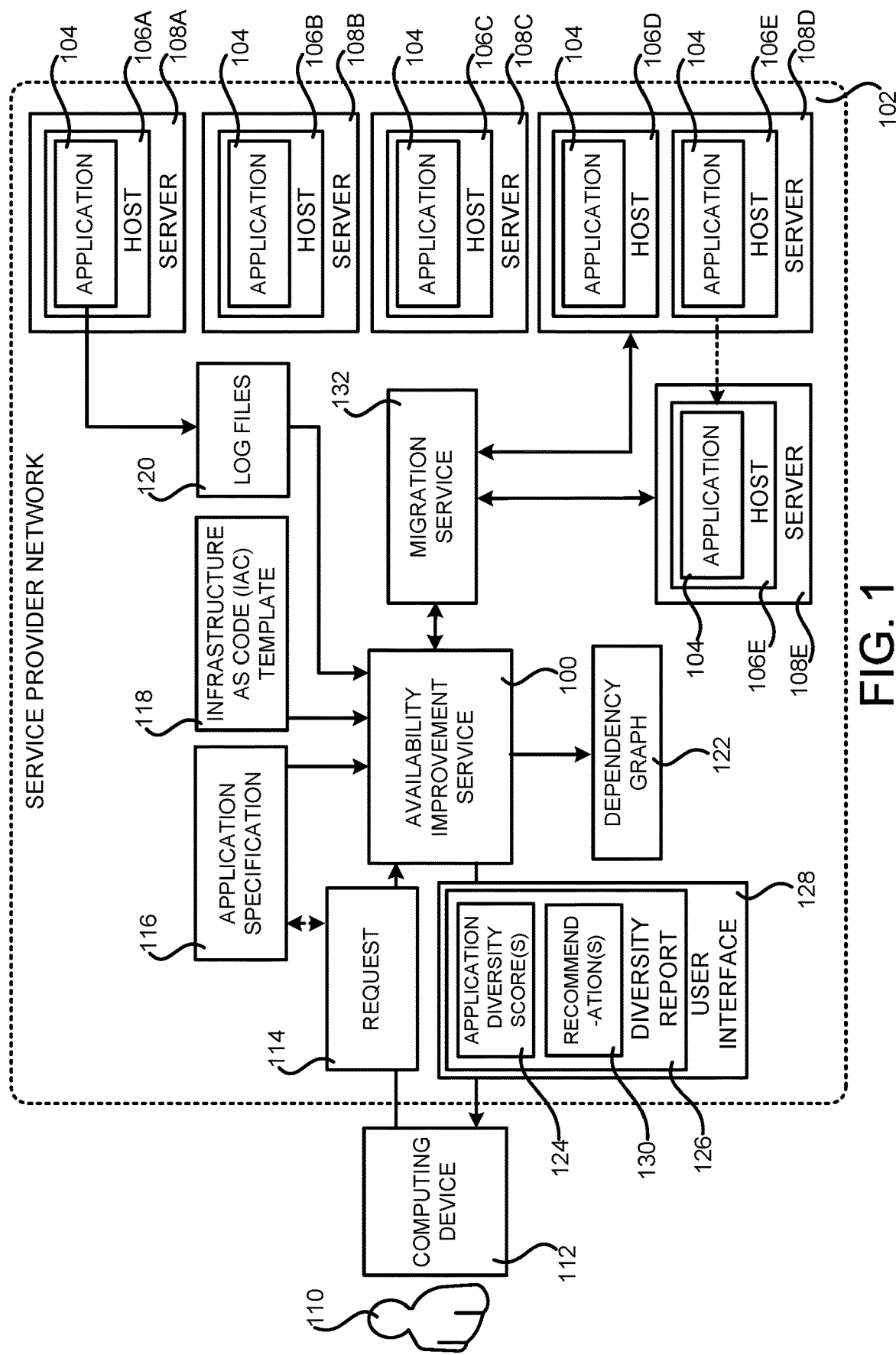
FIG. 1 is a software and network architecture diagram showing aspects of the operation of an availability improvement service configured to provide functionality for improving the availability of a distributed application using diversity scores, according to one particular configuration.

The following detailed description is directed to technologies for improving the availability of a distributed application through the use of diversity scores (which might be referred to herein simply as "scores") for the application that indicate the extent to which the configuration of hosts implementing the application complies with best practices for maximizing availability of the application. Through an implementation of the disclosed technologies, the configuration for redundant dependencies for an application can be identified and, potentially, modified to minimize the risk of correlated failure of the hosts that implement the application. This can improve the availability (i.e. the extent to which the application is operational) of the application. Technical benefits other than those specifically mentioned herein can also be realized through an implementation of the disclosed technologies.

In one configuration disclosed herein, an availability improvement service is executed in a service provider network that is configured to provide computing resources on a permanent or an as-needed basis. Among other types of functionality, the computing resources provided by the service provider network can be utilized to implement the various network services and other programs described herein. The computing resources (which might be referred to herein simply as "resources" or a "resource") provided by the service provider network can include various types of computing resources, such as data processing resources like VM instances, data storage resources, networking resources, data communication resources, power resources, computing infrastructure components, network services, and the like.

The availability improvement service can receive or obtain an application specification for an application executing on hosts (e.g. VMs or physical hosts) in the service provider network. The application specification includes data that identifies the hosts used to implement the application along with data that identifies the physical location of the hosts. For example, the application specification might specify the server that a host is executing on, the rack that the server is located in, the room in which the rack is located, the data center in which the room is located, and/or the geographic region in which the data center is located. The application specification can also include additional data regarding the hosts utilized to implement an application in the service provider network.

Utilizing the application specification, the availability improvement service can identify components in the service provider network that the application is dependent upon for proper execution (which might be referred to herein as "dependencies"). For example, and without limitation, the availability improvement service might identify power components, network components, software components, network services, infrastructure components like hearing and air conditioning components, and/or other types of components that the application is dependent upon for execution.

Based upon the physical location of the hosts used to implement the application and the identified dependencies, the availability improvement service can compute scores that indicate the extent to which the configuration of the hosts implementing the application complies with best practices for maximizing availability of the application. For example, and without limitation, the availability improvement service can generate one score for the application based upon the physical location of the hosts used to implement the application and the components upon which the application is dependent. For instance, this score (which might be referred to as a "physical location diversity score") might be negatively impacted if two hosts (e.g. VMs) are located on the same server computer or rack and, therefore, have a higher probability of a correlated failure.

The availability improvement service can also compute another score for the application (which might be referred to herein as a "minimum number of data centers score") based upon the number of data centers that hosts executing the application are located in as compared to a required minimum number of data centers. The availability improvement service can also compute another score (which might be referred to herein as a "data center distribution score") for the application based upon the distribution of hosts utilized to execute the application across data centers as compared to a desired distribution. The availability improvement service can also compute other types of scores in other configurations.

Once the diversity scores have been computed, the availability improvement service can provide a user interface ("UI") that includes the scores to a user of the service provider network. The availability improvement service can also generate recommendations for improving one or more of the diversity scores and provide the recommendations in the UI or in another manner. For instance, in the example where two hosts are executing on the same server or on different servers in the same rack, the availability improvement service might provide a recommendation to migrate one of the hosts to a different server, rack, room, or data center. Other types of recommendations can be provided for improving the diversity scores.

The availability improvement service can also initiate operations for reconfiguring the hosts in order to improve the diversity scores, such as initiating operations for migrating a host to a new rack or server, migrating a host to a different data center, or instantiating new hosts for executing the application. The availability improvement service might also create a ticket in a ticketing system indicating that redundancy needs to be improved through the addition of hardware components, such as networking or hardware components. An engineer can retrieve the ticket from the ticketing system and install hardware for creating the identified redundancy. Various other services operating in the service provider network can be utilized to perform these operations.

Operations for improving the diversity scores, such as those described above, can be continually performed until one or more of the diversity scores meets or exceeds a threshold value. The threshold value can range between one value indicating that no probability of a correlated failure is acceptable and another value indicating that a high probability of a correlated failure is acceptable. The threshold value might be specified, for example, by a system administrator of the application.

Additional details regarding the various components and processes described briefly above for improving the availability of a distributed application by computing diversity scores will be presented below with regard to FIGS. 1-6.

It should be appreciated that the subject matter presented herein can be implemented as a computer process, a computer-controlled apparatus, a computing system, or an article of manufacture, such as a non-transitory computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

Those skilled in the art will also appreciate that aspects of the subject matter described herein can be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein can be practiced in distributed computing environments, such as a service provider network, where tasks can be performed by remote computing devices that are linked through a communications network. In a distributed computing environment, program modules can be located in both local and remote memory storage devices.

In the following detailed description, references are made to the accompanying drawings that form a part hereof, and that show, by way of illustration, specific configurations or examples. The drawings are not drawn to scale. Like numerals represent like elements throughout the several figures (which might be referred to herein as a "FIG." or "FIGS.").

FIG. 1 is a software and network architecture diagram showing aspects of the operation of an availability improvement service 100 (which might be referred to herein simply as "the service 100") configured to provide functionality for improving the availability of a distributed application 104 using diversity scores, according to one particular configuration. As shown in FIG. 1, the availability improvement service 100 operates in a service provider network 102 in one particular configuration.

The service provider network 102 is a computing network configured to provide computing resources (which might be referred to simply as "resources") on a permanent or an as-needed basis. Among other types of functionality, the computing resources provided by the service provider network 102 can be utilized to implement various types of network services such as, but not limited to, the availability improvement service 100 and the migration service 132 shown in FIG. 1. The computing resources provided by the service provider network 102 can include data processing resources like data storage resources, virtual machine ("VM") instances, networking resources, data communication resources, network services, and other types of computing resources.

A user of the service provider network 102, such as the user 110, can utilize an appropriate computing system, such as the computing device 112, to communicate with the service provider network 102 over an appropriate data communications network (not shown in FIG. 1A). In this way, a user 110 of the service provider network 102 can configure various aspects of the operation of the computing resources provided by the service provider network 102, or to otherwise control any computing resources being utilized by the user 110.

For example, and without limitation, a computing device 112 utilized by a user 110 of the service provider network 102 can be utilized to purchase access to computing resources in the service provider network 102, to configure aspects of the operation of the computing resources, to access and utilize functionality provided by the various services and systems described herein, and/or to perform other types of functionality with regard to the operation of the computing resources provided by the service provider network 102.

The computing devices utilized to configure and monitor the resources in the service provider network 102 (e.g. the computing device 112) can be any type of computing device capable of connecting to the service provider network 102 via a suitable data communications network such as, but not limited to, a laptop or desktop computer, a tablet computing device, a server computer, or a smartphone. Administrative users employed by the owner or operator of the service provider network 102, such as administrators managing the operation of the service provider network 102, can also connect with, manage, and utilize resources provided by network services executing within the service provider network 102 in a similar fashion.

As discussed briefly above, the service provider network 102 can be configured to execute various types of network services. For example, and without limitation, the service provider network 102 can execute an on-demand computing service (not shown in FIG. 1) for providing hosts 106 on-demand. The hosts 106 can be VMs or physical computers. The service provider network 102 can also execute a storage service, a serverless compute service, a cryptography service, an authentication service, a policy management service, a deployment service, and other types of services (some of which are described below).

As discussed briefly above, the service provider network 102 can execute network services that provide computing resources on a permanent or an as-needed basis. Among other types of functionality, the computing resources provided by the service provider network 102 can be utilized to implement the various network services described herein. As also discussed above, the computing resources provided by the service provider network 102 can be data storage resources, data processing resources, such as VMs or physical computers, networking resources, power resources, computing infrastructure resources, data communication resources, network services, and other types of resources.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 are enabled in one implementation by one or more data centers (not shown in FIG. 1). The data centers are facilities utilized to house and operate computer systems and associated components. The data centers typically include redundant and backup power, communications, cooling, and security systems. The data centers can also be located in geographically disparate locations, referred to herein as "regions."

The users of the service provider network 102 can access the computing resources provided by the service provider network 102 over a network, which can be a wide area communication network ("WAN"), such as the Internet, an intranet or an Internet service provider ("ISP") network or a combination of such networks. For example, and without limitation, a computing device 112 operated by a user 110 of the service provider network 102 can be utilized to access the service provider network 102 by way of such a network. It should be appreciated that a local-area network ("LAN"), the Internet, or any other networking topology known in the art that connects the data centers implementing the service provider network 102 to remote customers and other users can be utilized. It should also be appreciated that combinations of such networks can also be utilized.

As illustrated in FIG. 1, a distributed application 104 can be executed on one or more hosts 106 executing on server computers 108 in the service provider network 102. In the example shown in FIG. 1, the hosts 106 are VM instances. It should be appreciated, however, that the hosts 106 can also be physical computers (e.g. the servers 108) in other configurations. In the example configuration shown in FIG. 1, various components of the application 104 execute on a host 106A on the server 108A, on a host 106B on the server 108B, on a host 106C on a server 108C, and on the hosts 106D and 106E on the server 108D. As will be described in greater detail below, the servers 108 providing the hosts 106 can be installed in racks which can be located in rooms within a data center. A number of data centers containing rooms with racks of servers can also be located in distributed geographic locations.

As discussed above, network-based distributed applications, such as the application 104, commonly improve availability by relying upon redundancies for their dependencies. Redundant dependencies allow the application 104 to switch over to substitutes when any dependency fails. For example, if one of the hosts 106 utilized to implement the application 104 fails because of a loss of power or for another reason, another host 106 in another rack or data center that has not lost power can be utilized. In this way, availability of the application 104 can be maintained in the event of failures.

As also discussed above, when deploying a distributed application, such as the application 104, system administrators must take care to choose a diverse set of redundant dependencies with a low probability of correlated failure. For example, if a distributed application is executing on two hosts 106D and 106E, and the two hosts 106D and 106E share the same power supply (i.e. because they are both executing on the same server 108D), then the two hosts 106D and 106E are not appropriate substitutes for one another because they will both fail if the power supply fails or there is a failure of the server 108D. A correlated failure such as this can occur due to the failure of any type of dependency, such as networking components, power or power components, and heating or cooling components. A correlated failure can also occur due to the failure of software components or network services utilized by the application 104.

After deployment of an application 104, care must also be taken to maintain the diversity of redundant dependencies. For example, if a system administrator needs to replace one of two hosts (e.g. the host 106A), the new replacement host 106 should have the lowest probability of a correlated failure with the existing host (e.g. not co-located on the same server 108 or on servers 108 in the same rack, for instance). Creating and maintaining redundant dependencies can, however, be difficult for system administrators. As a result, it is not uncommon for distributed applications to fail due to a correlated failure of hosts as a result of the failure of a dependency. This can significantly impact the availability of an application. The technologies disclosed herein address these considerations and potentially others.

In order to address these and potentially other considerations, technologies are disclosed herein for improving the availability of a distributed application through the use of application diversity scores 124 (which might be referred to herein simply as "scores") for an application 104 that indicate the extent to which the configuration of hosts 106 implementing the application 104 complies with best practices for maximizing availability of the application 104. Through an implementation of the disclosed technologies, the configuration of redundant dependencies for the application 104 can be identified and, potentially, modified to minimize the risk of correlated failure of the hosts 106 that implement the application 104. This can improve the availability of the application 104 (i.e. the extent to which the application 104 is operational). Technical benefits other than those specifically mentioned herein can also be realized through an implementation of the disclosed technologies.

In one configuration disclosed herein, the availability improvement service 100 is executed in the service provider network 102. As discussed briefly above, the service 100 provides functionality improving the availability of the distributed application 104 by calculating and utilizing the scores 124. In order to utilize this functionality, a user 110 can utilize a computing device 112 to submit a request 112 to the service 100 to analyze the configuration of the application 104 for compliance with best practices for maximizing availability. The request 114 can be submitted through a UI 128, through a network services application programming interface ("API"), or through another type of interface. The request 114 might also be initiated periodically in an automated fashion in order to ensure that the configuration of the application 104 continues to meet the best practices for maximizing availability.

Responsive to receiving the request 114, the service 100 can receive or obtain an application specification 116 for the application 104. The application specification 116 includes data that identifies the hosts 106 (or other computing resources) used to implement the application 104 along with data that identifies the physical location of the hosts 106. For example, the application specification 116 might specify the server 108 that a host 106 is executing on, the rack that the server 108 is located in, the room in which the rack is located, the data center in which the room is located, and/or the geographic region in which the data center is located. The application specification 116 can also include additional data regarding the hosts 106 utilized to implement the application 104 in the service provider network 102.

In the example configuration shown in FIG. 1, the application specification 116 is included in or referenced by the request 114. The service 100 (or another service) can also generate an application specification 116 in other configurations. In one particular configuration, for example, the application specification 116 is generated from an infrastructure as code ("IAC") template 118. The IAC template 118 includes declarative language that can be consumed by an IAC service (not shown in FIG. 1) to instantiate computing resources in the service provider network 102.

For example, and without limitation, the data contained in the IAC template 116 might specify that a host 106 is to be created that is connected to a storage volume and a database. In this example, an IAC service (not shown in FIG. 1) can utilize a control plane to interact with an on-demand computing service (also not shown in FIG. 1) to provision the requested host 106, interact with a storage service to provision a storage volume, interact with a database service to provision a database, and configure the host 106 to access both the storage volume and the database. An IAC service can also interact with other network services via a control plane to provision other types of computing resources in the service provider network.

The IAC template 118 can be expressed using a declarative language, such as JAVASCRIPT OBJECT NOTATION ("JSON") or EXTENSIBLE MARKUP LANGUAGE ("XML"). In this regard it should be appreciated, however, that another type of language capable of describing an infrastructure in a service provider network 102, including resources, dependencies between the resources, and connections between the resources, can be utilized in other configurations.

In another configuration, the service 100 (or another service) can utilize log files 120 generated by the application 104 to generate the application specification 116. In particular, the service 100 can utilize the contents of the log files 120 to identify the hosts 106 and their physical locations. The service 100 can also utilize the log files 120 to identify hardware and software dependencies of the application 104. In this regard, it is to be appreciated that the hosts and other computing resources, their physical locations, and the application dependencies can be identified in other ways in other configurations. For example, in another configuration, billing data (not shown in FIG. 1) that identifies the hosts 106 and/or other computing resources utilized to perform the application 104 can also be utilized to identify the hosts 106 and their physical locations in another configuration.

Utilizing the application specification 116, the availability improvement service 100 can identify components in the service provider network 102 that the application 104 is dependent upon for proper execution (i.e. its dependencies). For example, and without limitation, the availability improvement service 100 might identify power components, network components, software components, network services, infrastructure components like hearing and air conditioning components, and/or other types of components that the application 104 is dependent upon for proper execution based upon the physical location of the hosts 106. The dependencies for the application 104 are represented in a dependency graph 122 in one particular configuration. An illustrative dependency graph 122 is discussed below with regard to FIG. 3.

Based upon the physical location of the hosts 106 used to implement the application 104 and the identified dependencies, the availability improvement service can compute scores 124 that indicate the extent to which the configuration of the hosts 106 implementing the application 104 complies with best practices for maximizing availability of the application 104. For example, and without limitation, the availability improvement service can generate one score 124 for the application 104 based upon the physical location of the hosts 106 used to implement the application 104 and the components upon which the application 104 is dependent.

For instance, this score (which might be referred to as a "physical location diversity score") might be negatively impacted if two hosts 104 (e.g. VMs) are located on the same server computer 108 or rack and, therefore, have a higher probability of a correlated failure. In the example configuration shown in FIG. 1, for instance, the hosts 106D and 106E are located on the same server 108 and, therefore, there is a high probability of a correlated failure of the hosts 106D and 106E if the server 108 or one if its dependencies fails.

The availability improvement service can also compute another score for the application 104 (which might be referred to herein as a "minimum number of data centers score") based upon the number of data centers that hosts 106 executing the application are located in as compared to a required minimum number of data centers. For instance, in the example shown in FIG. 1, the hosts 106C, 106C, 106D, and 106E might be located in one data center while the host 106A is located in another data center. If the required minimum number of data centers is greater than two (e.g. three), then in this example the minimum number of data centers score will be penalized since hosts are only located in two data centers.

The availability improvement service 100 can also compute another score 124 (which might be referred to herein as a "data center distribution score") for the application 104 based upon the distribution of hosts 106 utilized to execute the application 104 across data centers as compared to a desired distribution of hosts 106 across data centers. For instance, in the example shown in FIG. 1 there are five hosts 106 utilized to implement the application 104. In this case the desired distribution might be two hosts 106 in one data center, two hosts 106 in another data center, and one host 106 in yet another data center. The data center distribution score 124 for the configuration shown in FIG. 1 will be penalized in this example if the hosts 106 have a different distribution across data centers (e.g. four hosts 106 in one data center and one host 106 in another data center).

It is to be appreciated that the diversity scores 124 described above are merely illustrative. The availability improvement service 100 can also compute other types of scores 124 describing the compliance of an application 104 with best practices for maximizing availability in other configurations.

Once the availability improvement service 100 has computed the diversity scores 124, the service 100 can provide the scores 124 to a user 110 of the service provider network 102 through the UI 128. In particular, the UI 128 can include a diversity report 126 that includes the scores 124 computed in the manner described above. Other scores can also be generated and presented in the UI 128. The scores can also be provided to other network services or other types of consumers through an appropriate network services API or in another manner.

The availability improvement service 100 can also generate recommendations 130 for improving one or more of the diversity scores 124 and provide the recommendations 130 in the UI 128 or in another manner (e.g. through a network services API). For instance, in the example shown in FIG. 1 where two hosts 106D and 106E are executing on the same server 102 (or on different servers in the same rack), the availability improvement service 100 might provide a text recommendation 130 to migrate one of the hosts 106D or 106E to a different server 108, rack, room, or data center. The availability improvement service 100 can also provide recommendations for moving or instantiating other types of computing resources utilized to perform the application 104.

In some configurations, the availability improvement service 100 might also create a ticket in a ticketing system (not shown in FIG. 1) indicating that redundancy for the application 104 needs to be improved through the addition of hardware components, such as networking or hardware components. An engineer can retrieve the ticket from the ticketing system and, based upon the recommendation in the ticket, install hardware for creating the identified redundancy. Other types of recommendations 130 can be provided for improving the diversity scores 124.

The availability improvement service 100 can also initiate operations for reconfiguring the hosts 106 (or other computing resources) in order to improve the diversity scores 124, such as initiating operations for migrating a host 106 (or another type of computing resource) to a new rack or server 108, migrating a host 106 (or another type of computing resource) to a different data center, or instantiating new hosts 106 (or another type of computing resource) for executing the application 104. In the example shown in FIG. 1, for instance, the service 100 has instructed the migration service 132 to migrate (i.e. move) the host 106E from the server 108D to the server 108E. The server 108E can be located in a different rack or even data center than the server 108D. In this way, the chances of a correlated failure of the hosts 106D and 106E is reduced and the application diversity scores 124 can be improved. Various other services operating in the service provider network can be utilized to perform these operations. Computing resources other than hosts 106 can be moved, reconfigured, or instantiated in a similar manner.

As discussed briefly above, the operations for improving the diversity scores 124, such as those described above, can be continually performed until one or more of the diversity scores 124 meets or exceeds a threshold value. The threshold value can range between one value indicating that no probability of a correlated failure of hosts is acceptable and another value indicating that a high probability of a correlated failure of hosts is acceptable. The threshold value might be specified, for example, by a system administrator of the application 104. Additional details regarding the operation of the availability improvement service 100 will be provided below with regard to FIGS. 2-5.

Figure 2:
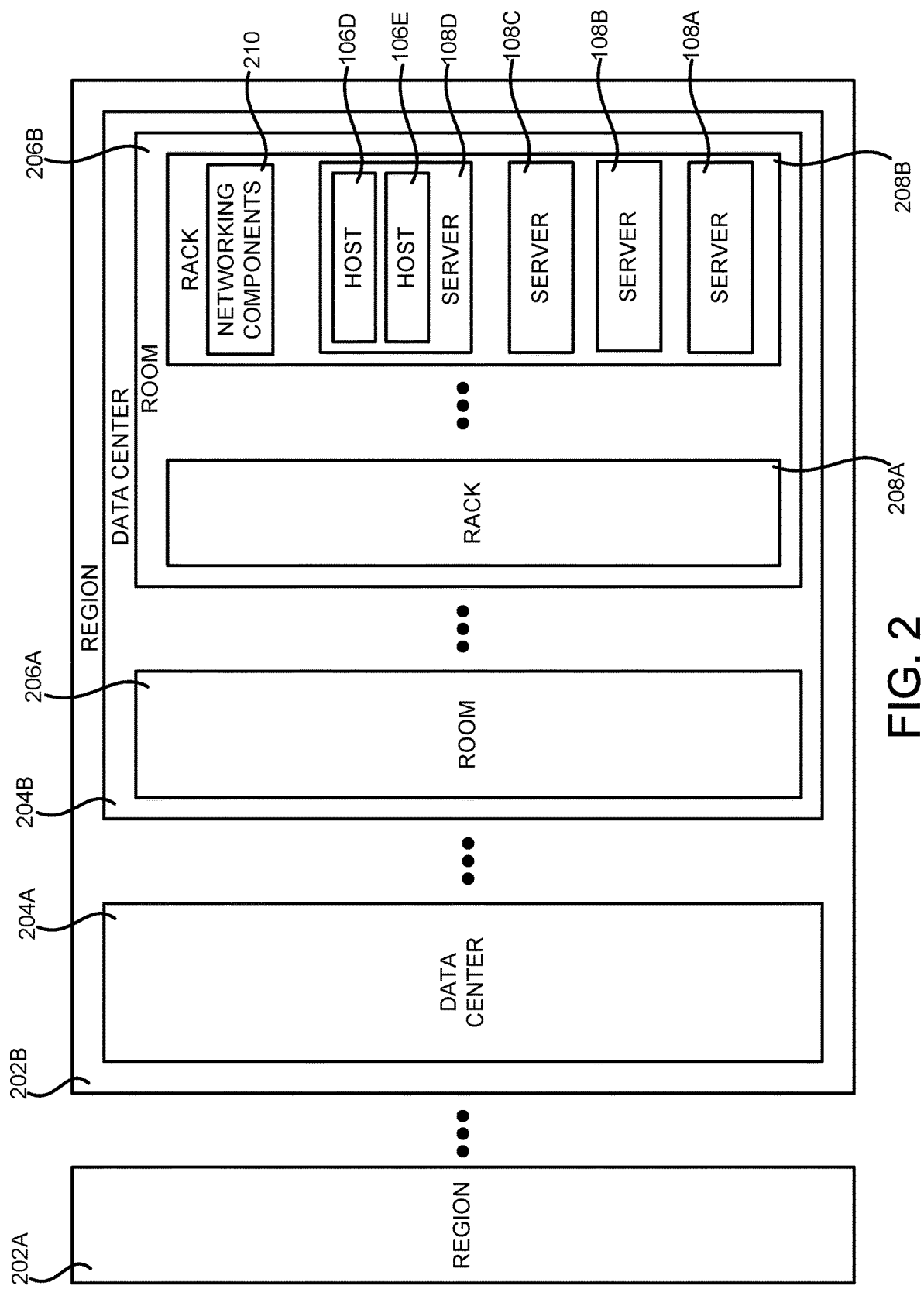
FIG. 2 is a network diagram showing aspects of the configuration of a service provider network that can be utilized to implement the availability improvement service illustrated in FIG. 1, according to one particular configuration.

FIG. 2 is a network diagram showing aspects of the configuration of a service provider network 102 that can be utilized to implement the availability improvement service 100 illustrated in FIG. 1, according to one particular configuration. As shown in FIG. 2, the service provider network 102 can be implemented in a number of data centers 204A and 204B located in a number of geographically disparate regions 202A and 202B. Each data center 204 can include a number of rooms 206A and 206B that include racks 208A and 208B of servers 108A-108D. A rack 208B can include networking components 210 for supporting the servers 108 in the rack 208B, such as a "top of rack" router.

The server computers 108 can be standard tower, rack-mount, or blade server computers configured appropriately for providing the various computing resources described herein. As mentioned above, the computing resources provided by the service provider network 102 can be data storage resources, data processing resources such as VM instances or hardware computing systems, database resources, networking resources, and others. Some of the servers 108 can also be configured to execute network services capable of instantiating, providing and/or managing the computing resources.

An appropriate LAN (not shown in FIG. 2) can also be utilized to interconnect the server computers 108. The LAN is also typically connected to a wide area network (also not illustrated in FIG. 2) for connecting the data centers to one another and, potentially, to a public network such as the internet. Appropriate load balancing devices or other types of network infrastructure components can also be utilized for balancing a load between each of the data centers 204, between each of the servers 108 in each data center 204, and, potentially, between hosts 106 or other types of computing resources in each of the data centers 204.

It should be appreciated that the configuration of the data center 204B shown in FIG. 2 is merely illustrative and that other implementations can be utilized. It should also be appreciated that the description of the network topology of the service provider network 102 presented here has been greatly simplified and that many more computing systems, software components, networks, and networking devices can be utilized to interconnect the various computing systems disclosed herein and to provide the functionality described above.

Figure 3:
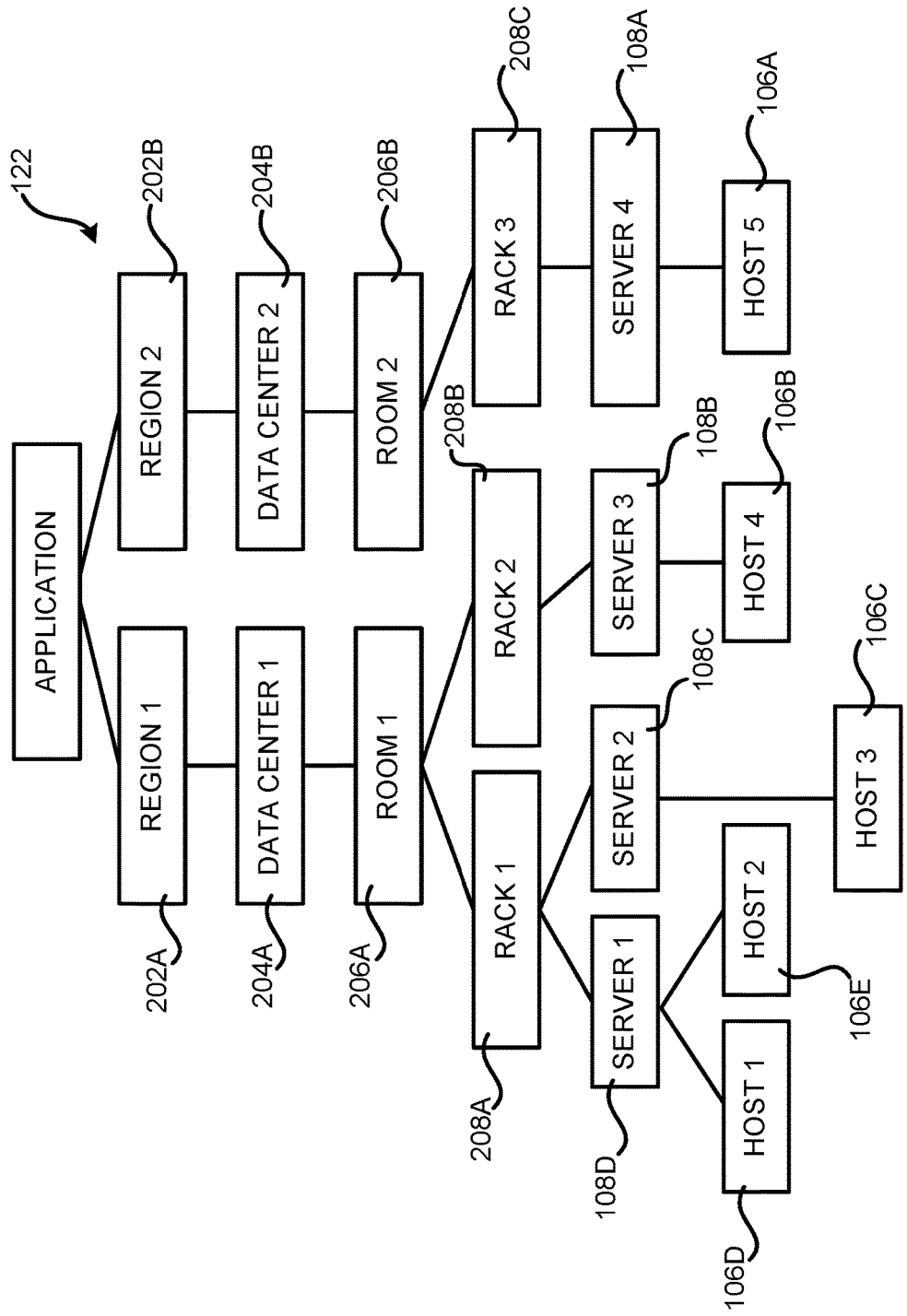
FIG. 3 is a data structure diagram showing an illustrative dependency graph for hosts utilized to implement a distributed application, according to one particular configuration.

FIG. 3 is a data structure diagram showing an illustrative dependency graph 122 for hosts 106 utilized to implement a distributed application 104, according to one particular configuration. The dependency graph 122 reflects a configuration of the hosts 106A-106D and server computers 108A-108D shown in FIG. 1. As discussed above, the service 100 can create the dependency graph 122 based upon the application specification 116. In particular, once the service 100 has the identity of the hosts 106 and their physical locations, the service 100 can determine the dependencies for each of the hosts 106.

In the example shown in FIG. 3, for instance, the hosts 106D and 106E are hosted by a single server 108D, and the host 106C is hosted by the server 108C. The servers 108C and 108D are located in the same rack 208A. The rack 208A is located in the room 206A in the data center 204A, which is located in the region 202A. The host 106C is hosted by the server 108C, which is also located in the rack 208A. The host 106B is hosted by the server 108B, which is located in the rack 208B in the room 206A. The host 106A is hosted by the serer 108A, which is located in the rack 208C. The rack 208C is located in room 206B of the data center 204B. The data center 204B is located in the region 202B.

It should be appreciated that, in the configuration shown in FIG. 3, several hosts 106 have a high likelihood of correlated failure. For example, the hosts 106D and 106E are hosted by the same server 108D. A failure of the server 108D, or one of its dependencies (e.g. the top of rack router in the rack 208A or a fire in the room 206A) would result in the correlated failure of the hosts 106D and 106E. Similarly, the hosts 106C, 106D, and 106E are located in the same rack 208A. A failure of the top of rack router for this rack 208A would result in the correlated failure of these three hosts 106. Likewise, the hosts 106B, 106C, 106D, and 106E are located in the same room 206A. A fire in the room 206A or a loss of power to the data center 204A would result in a correlated failure of all four of these hosts.

The mechanisms described above (and in further detail below with regard to FIG. 4) can generate diversity scores 124 that reflect the lack of compliance with best practices for maximizing availability for the configuration shown in FIG. 3. The mechanisms described above can also take corrective action to improve the diversity scores 124. For example, and without limitation, the service 100 might cause the host 106D or the host 106E to be migrated to the data center 204B. Likewise, the service 100 might cause the host 106C to be migrated to a server 108 in a different rack in the data center 204. Likewise, the service 100 might cause the host 106B to me moved to a different room 206 in the data center 204 or to another data center such as the data center 204B. The service 100 might also cause one or more of the hosts 106C, 106D or 106E to be migrated to another data center 204. Other actions might also be taken in order to improve the diversity scores 124 computed for the application 104 and, thereby, improve the availability of the application 104. Additional details regarding this process will be provided below with regard to FIG. 4.

Figure 4:
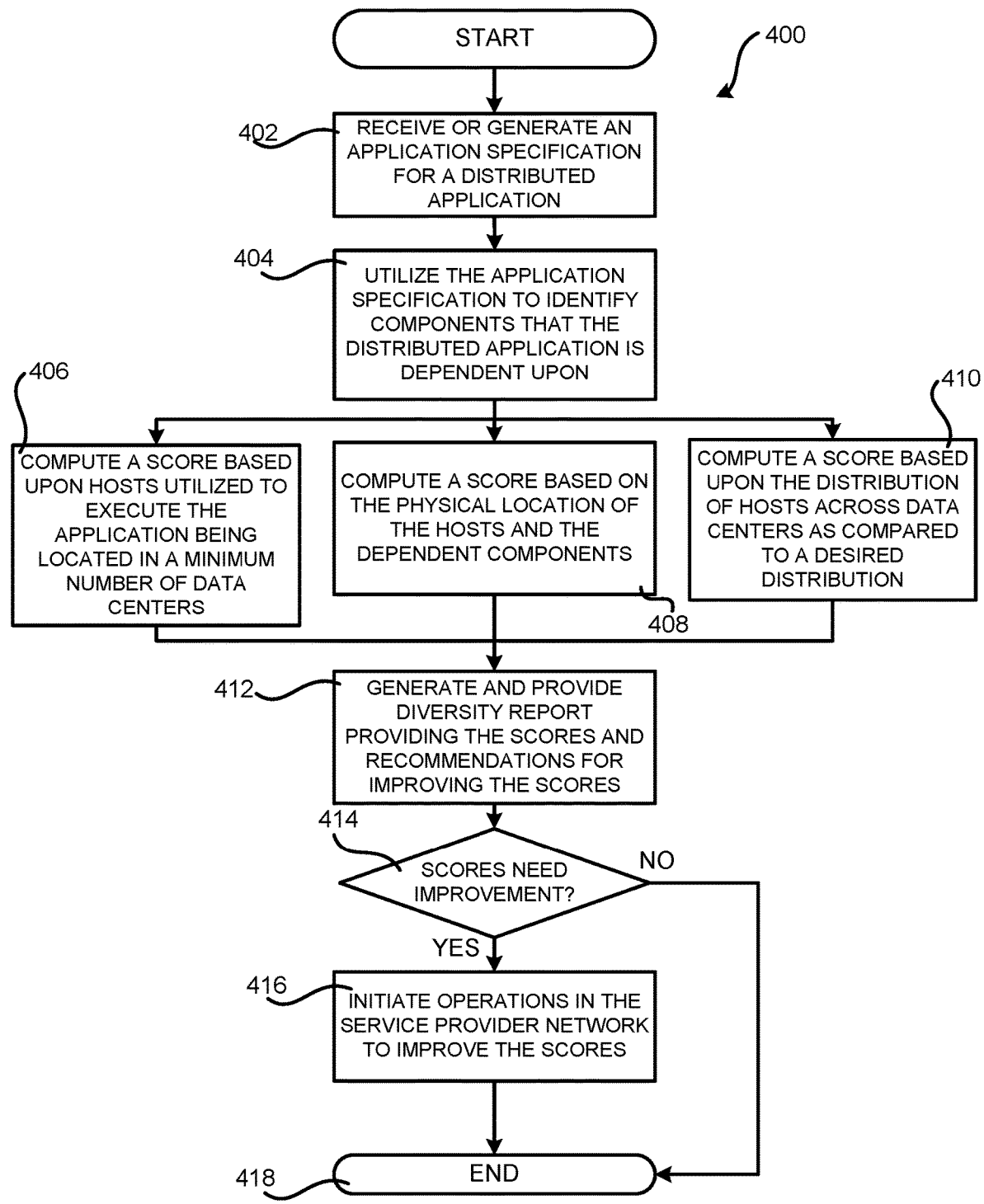
FIG. 4 is a flow diagram showing a routine that illustrates the operation of the availability improvement service shown in FIG. 1 for improving the availability of a distributed application using diversity scores, according to one particular configuration.

FIG. 4 is a flow diagram showing a routine 400 that illustrates the operation of the availability improvement service 100 shown in FIG. 1 for improving the availability of a distributed application 104 using diversity scores 124, according to one particular configuration. It should be appreciated that the logical operations described herein with respect to FIG. 4, and the other FIGS., can be implemented (1) as a sequence of computer implemented acts or program modules running on a computing system and/or (2) as interconnected machine logic circuits or circuit modules within the computing system. The implementation of the various components described herein is a matter of choice dependent on the performance and other requirements of the computing system. Accordingly, the logical operations described herein are referred to variously as operations, structural devices, acts, or modules.

These operations, structural devices, acts, and modules can be implemented in software, in firmware, in special purpose digital logic, and any combination thereof. It should also be appreciated that more or fewer operations can be performed than shown in the FIGS. and described herein. These operations can also be performed in parallel, or in a different order than those described herein. Some or all of these operations can also be performed by components other than those specifically identified.

The routine 400 begins at operation 402, where the service 100 receives or generates an application specification 116 for a distributed application 104 executing in the service provider network 102. As discussed above, the application specification 116 can be provided with or linked to by the request 114. Alternately, the application specification 116 can be generated based upon an IAC template 118 or log files 120 generated by the application 104. The application specification 116 can be generated in other ways in other configurations.

From operation 402, the routine 400 proceeds to operation 404, where the service 100 utilizes the application specification 116 to identify the components that the distributed application 104 is dependent upon. As discussed above, the application specification 116 might generate a dependency graph 122 that describes the various dependencies of the application 104. Another type of graph or tree of dependencies can be created in other configurations.

From operation 404, the routine 400 proceeds to operations 406, 408, and 410, where the service 100 generates the scores 124. In particular, at operation 406, the service 100 generates a score 124 upon the number of data centers 204 that hosts 106 executing the application 104 are located in as compared to a required minimum number of data centers 204. At operation 408, the service 100 generates a score 124 for the application 104 based upon the physical location of the hosts 106 used to implement the application 104 and the components upon which the application 104 is dependent. At operation 410, the service 100 computes a score 124 for the application 104 based upon the distribution of hosts 106 utilized to execute the application across data centers 204 as compared to a desired distribution of hosts 106. The availability improvement service 100 can also compute other types of scores 124 in other configurations.

From operations 406, 408, and 410, the routine 400 proceeds to operation 412, where the service 100 generates and provides the diversity report 126, which provides the scores 124. As discussed above, the service 100 can also generate recommendations 130 for improving the scores 124. The recommendations 124 can also be provided in the diversity report 126. The diversity report 126 can be provided in the UI 128, through a network services API, or in another manner.

From operation 412, the routine 400 proceeds to operation 414, where the service 100 determines if the scores 124 need to be improved (e.g. there is a chance of a correlated failure of hosts 106 utilized to implement the application 104). If the scores 124 need to be improved, the routine 400 proceeds from operation 414 to operation 416.

At operation 416, the service 100 initiates operations for reconfiguring the hosts 106 in order to improve the diversity scores 124, such as initiating operations for migrating a host 106 to a new rack 208 or server 208, migrating a host 106 to a different data center 202, or instantiating new hosts 106 for executing the application. Various other services operating in the service provider network 102, such as the migration service 132, can be utilized to perform these operations. As discussed above, these operations can be continually performed until one or more of the diversity scores 124 meets or exceeds a threshold value. From operation 416, the routine 400 proceeds to operation 418, where it ends.

FIG. 5 is a user interface diagram showing an illustrative UI 128 that includes a diversity report 126 generated by the availability improvement service 100 of FIG. 1, according to one particular configuration. The example diversity report 126 shown in FIG. 5 corresponds to the dependency graph 122 shown in FIG. 3. In particular, the diversity report 128 identifies the hosts 106, the regions 202 in which they are located, the data center 202 that each host 106 is located in, the rack 206 that the hosts 106 are located in, and the server 108 hosting the hosts 106.

The UI 128 shown in FIG. 5 includes a score 124A indicating that the configuration of the application 104 does not utilize the minimum number of data centers 204 (in this case three data centers 204). The UI 128 also provides a recommendation 130A to improve the score 124A (i.e. move one of the hosts 106 to a new data center 204).

The UI 128 also includes a score 124B that reflects the fact that two three of the hosts 106 (i.e. the hosts 106C, 106D, and 106E) share the same server 108 or rack 206. The UI also provides a recommendation 130B for moving two of the hosts 106C, 106D, or 106E from the rack 208A to a different rack 208, potentially in another room 206 or even data center 202.

The UI 128 also includes a score 124C indicating that the configuration of the hosts 106 for implementing the application 104 does not comply with a recommended distribution of hosts 106 across data centers 204. In this example, the ideal distribution of five hosts 106 across data centers 204 is to have two hosts 106 in one data center 204, two hosts 106 in another data center 204, and one host 106 in yet another data center 204. Accordingly, the UI 128 also provides a recommendation 130C to move two hosts from the data center 204A to another data center 204. It is to be appreciated that the UI 128 shown in FIG. 5 is merely illustrative and that the UI 128 can include different elements than that shown in FIG. 5.

It is also to be appreciated that, according to configurations, the scores 124 can be utilized to allocate limited technical resources to improve the availability of different deployments of the same application 104. For example, in some configurations multiple deployments of the same application 104 can be implemented in the service provider network 102. In such a configuration, the scores 124 for the different deployments of the application 104 can be generated independently. The scores 124 can then be compared to identify the deployment that has the lowest scores 124. Technical resources can then be assigned to improve the scores 124 for the deployment, or deployments, having the lowest scores 124. The scores 124 can be utilized in other ways in other configurations.

Figure 6:
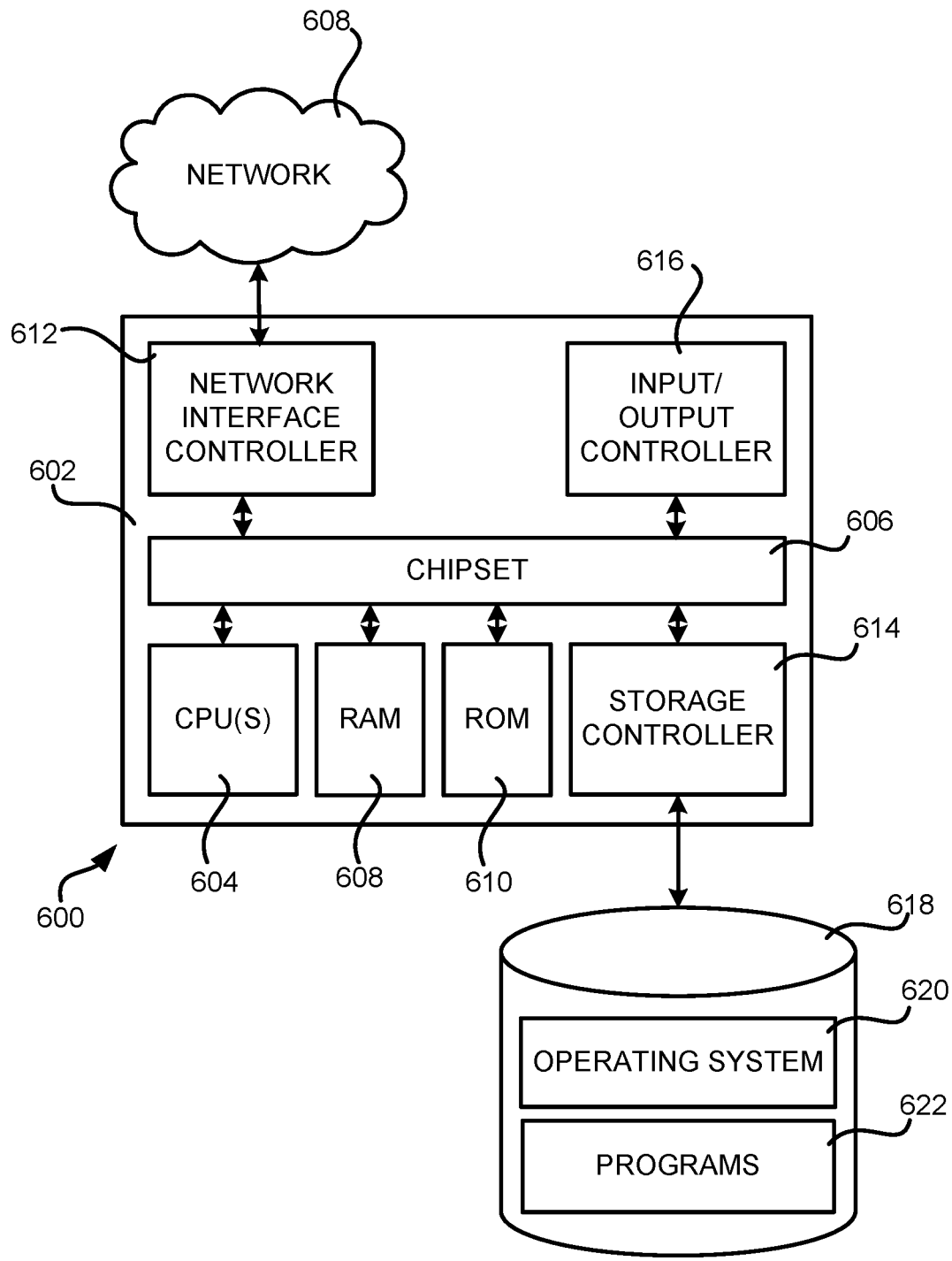
FIG. 6 is a computer architecture diagram showing an illustrative computer hardware architecture for implementing a computing device that can be utilized to implement aspects of the various technologies presented herein.

FIG. 6 shows an example computer architecture for a computer 600 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network 608. The chipset 606 can include functionality for providing network connectivity through a NIC 612, such as a gigabit Ethernet adapter. The NIC 612 is capable of connecting the computer 600 to other computing devices over the network 608. It should be appreciated that multiple NICs 612 can be present in the computer 600, connecting the computer to other types of networks and remote computer systems.

The computer 600 can be connected to a mass storage device 618 that provides non-volatile storage for the computer. The mass storage device 618 can store an operating system 620, programs 622, and data, which have been described in greater detail herein. The mass storage device 618 can be connected to the computer 600 through a storage controller 614 connected to the chipset 606. The mass storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 600 can store data on the mass storage device 618 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 618 is characterized as primary or secondary storage, and the like.

For example, the computer 600 can store information to the mass storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the mass storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 618 can store an operating system 620 utilized to control the operation of the computer 600. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 618 can store other system or application programs and data utilized by the computer 600.

In one configuration, the mass storage device 618 or other computer-readable storage media is encoded with computer-executable instructions which, when loaded into the computer 600, transform the computer from a general-purpose computing system into a special-purpose computer capable of implementing the configurations described herein. These computer-executable instructions transform the computer 600 by specifying how the CPUs 604 transition between states, as described above. According to one configuration, the computer 600 has access to computer-readable storage media storing computer-executable instructions which, when executed by the computer 600, perform the various processes described above with regard to FIGS. 1-5. The computer 600 can also include computer-readable storage media for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIG. 6, can include other components that are not explicitly shown in FIG. 6, or can utilize an architecture completely different than that shown in FIG. 6.

Based on the foregoing, it should be appreciated that technologies for improving the availability of a distributed application using diversity scores have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A system, comprising:
   one or more processors; and at least one non-transitory computer-readable storage medium having instructions stored thereupon which, when executed by the one or more processors, cause the system to:
- receive an application specification comprising data identifying hosts in a service provider network utilized to execute an application and physical locations that include host locations, server locations, and rack locations;
- utilize the application specification to identify one or more components in the service provider network that the application is dependent upon;
- compute a first score for the application based, at least in part, upon a diversity of the physical locations that include the host locations, the server locations, and the rack locations, and the one or more components in the service provider network that the application is dependent upon,
- compute a second score for the application based, at least in part, upon a number of data centers in which the hosts are located,
- wherein the first score and the second score indicate a risk of correlated failure for the hosts utilized to execute the application; and
- initiate one or more operations in the service provider network to improve one or more of the first score or the second score for the application.

2. The system of claim 1, wherein
computing the second score for the application is based, at least in part, upon whether the hosts are located in a minimum number of the data centers.

3. The system of claim 2, wherein the hosts are located in one or more data centers, and wherein the at least one non-transitory computer-readable storage medium has further instructions stored thereupon to:
- utilize the application specification to compute a third score for the application based, at least in part, upon a distribution of the hosts among the data centers; and
- initiate one or more operations in the service provider network to improve one or more of the first score, the second score, or the third score for the application.

4. The system of claim 3, wherein the at least one non-transitory computer-readable storage medium has further instructions stored thereupon to provide a user interface (UI) comprising the first score, the second score, and the third score and one or more recommendations for improving the first score, the second score, or the third score.

5. The system of claim 3, wherein initiate one or more operations in the service provider network to improve the first score, the second score, or the third score comprises causing one of the hosts located in a first data center to be migrated to a second data center.

6. The system of claim 3, wherein initiate one or more operations in the service provider network to improve the first score, the second score, or the third score comprises causing one of the hosts located in a first rack to be migrated to a second rack.

7. A computer-implemented method, comprising:
- identifying computing resources to perform an application;
- identifying physical locations associated with the computing resources, wherein the physical locations include one or both of rack locations and server locations;
- computing a first score corresponding to an availability of the application based, at least in part, on a redundancy of the computing resources and the physical locations;
- computing a second score corresponding to the availability of the application based, at least in part, upon whether the identified computing resources are located in a minimum number of locations; and
- determining whether the first score is at least a threshold value, and, if not, enabling one or more computing resources to perform the application until the first score meets or exceeds the threshold value,
  - wherein the one or more computing resources are different computing resources than the identified computing resources.

8. The computer-implemented method of claim 7, wherein the computing resources and the physical locations are identified based, at least in part, on an application specification for the application, the application specification comprising data identifying the computing resources, and the physical locations.

9. The computer-implemented method of claim 7, wherein the computing resources are identified based, at least in part, on an infrastructure as code (IAC) template for the application.

10. The computer-implemented method of claim 7, wherein the computing resources are identified based, at least in part, on log files generated by the application.

11. The computer-implemented method of claim 7, further comprising:
- determining whether the second score is at least a second threshold value, and, if not, enable the one or more computing resources to perform the application until the second score meets or exceeds the second threshold value.

12. The computer-implemented method of claim 7, further comprising:
- computing a third score corresponding to the availability of the application based, at least in part, upon a distribution of the identified computing resources among a plurality of locations; and
- determining whether the third score is at least a third threshold value, and, if not, enable the one or more computing resources to perform the application until the third score meets or exceeds the third threshold value.

13. The computer-implemented method of claim 7, wherein enable one or more computing resources to perform the application until the first score meets or exceeds the threshold value comprises causing at least one of the identified computing resources to be migrated from a first location to a second location.

14. The computer-implemented method of claim 7, wherein enable one or more computing resources to perform the application until the first score meets or exceeds the threshold value comprises instantiating one or more new computing resources for performing the application in a location that is different than a location of the identified one or more computing resources.

15. A system, comprising:
at least one non-transitory computer-readable storage medium to store instructions, which, in response to being performed, by one or more processors, cause the system to:
- identify computing resources to perform an application;
- identify physical locations associated with the computing resources, wherein the physical locations include one or both of rack locations and server locations;
- compute a first score corresponding to an availability of the application based, at least in part, on a redundancy of the computing resources and the physical locations;

compute a second score corresponding to the availability of the application based, at least in part, upon whether the identified computing resources are located in a minimum number of locations; and determine whether the first score is at least a threshold value, and, if not, enable one or more computing resources to perform the application until the first score meets or exceeds the threshold value, wherein the one or more computing resources are different computing resources than the identified computing resources.

16. The system of claim 15, wherein the computing resources and the physical locations are identified based, at least in part, on an application specification for the application.

17. The system of claim 15, wherein the non-transitory computer-readable storage medium stores further instructions to cause the system to:

determine whether the second score is at least a second threshold value, and, if not, enable the one or more computing resources to perform the application until the second score meets or exceeds the second threshold value.

18. The system of claim 15, wherein the non-transitory computer-readable storage medium stores further instructions to cause the system to:

compute a third score corresponding to the availability of the application based, at least in part, upon a distribution of the identified computing resources among a plurality of locations; and determine whether the third score is at least a third threshold value, and, if not, enable the one or more computing resources to perform the application until the third score meets or exceeds the third threshold value.

19. The system of claim 15, wherein enable one or more computing resources to perform the application until the first score meets or exceeds the threshold value comprises causing at least one of the identified computing resources to be migrated from a first location to a second location.

20. The system of claim 15, wherein enable one or more computing resources to perform the application until the first score meets or exceeds the threshold value comprises instantiating one or more new computing resources for performing the application in a location that is different than a location of the identified one or more computing resources.

* * * * *